Jan. 27, 1970  F. E. ROBERTS ET AL  3,491,581
THERMOCOUPLE AND SAMPLE HOLDER APPARATUS FOR USE IN
DIFFERENTIAL THERMAL ANALYSIS
Filed Feb. 7, 1968  2 Sheets-Sheet 1
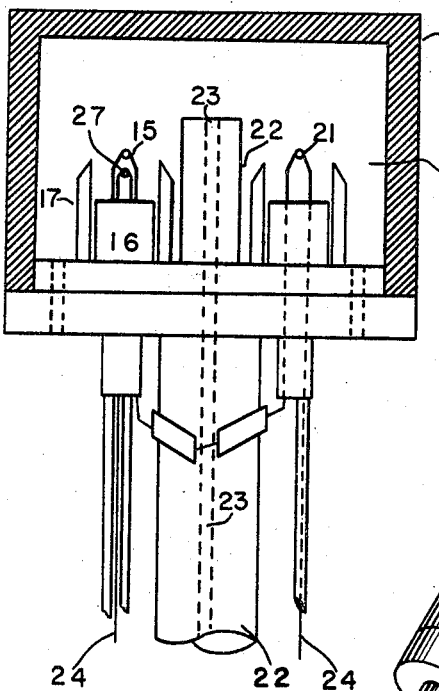
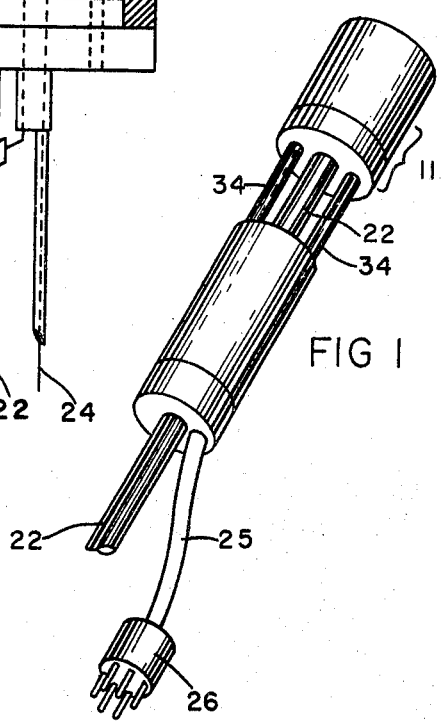
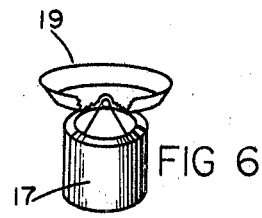
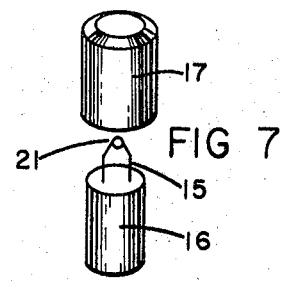
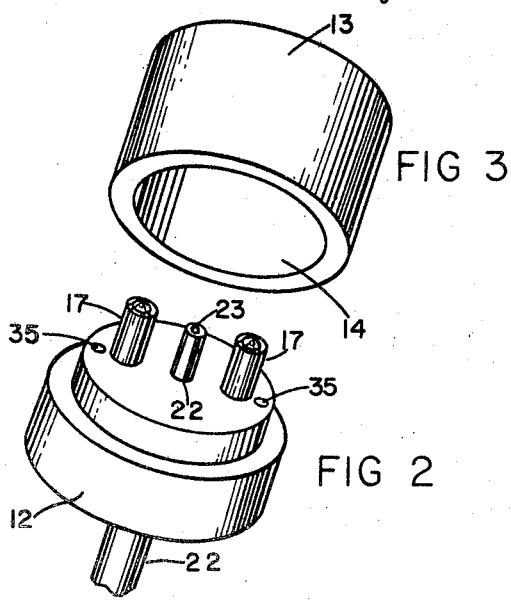
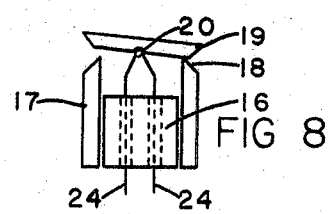
FRANK E. ROBERTS
ROBERT E. HARLAN
CO-INVENTORS
BY Marion E. Shafer
ATTORNEY FRANK E. ROBERTS
ROBERT E. HARLAN
CO-INVENTORS
BY Marion E. Shafer
ATTORNEY

United States Patent Office 3,491,581
Patented Jan. 27, 1970

3,491,581
THERMOCOUPLE AND SAMPLE HOLDER APPARATUS FOR USE IN DIFFERENTIAL THERMAL ANALYSIS
Frank E. Roberts, 5605 Wellington 78745, and Robert E. Harlan, 6202 Wynona 78757, both of Austin, Tex.
Filed Feb. 7, 1968, Ser. No. 703,771
Int. Cl. G01n 25/22
U.S. Cl. 73—15     1 Claim

ABSTRACT OF THE DISCLOSURE

An improved sample holder assembly for use in micro Differential Thermal Analysis work in which an interchangeable plug in sample holder assembly is co-axially mounted on a single post support post also serves as a means of introducing desired gases into the test chamber during the test, while the test sample tray is fabricated from a metal foil material and adapted to be supported at only two points with one of said points of support being fabricated from a non-thermoconductive material and the other point of support being at a dimple fabricated in the base of the foil sample tray and adapted to fit over and rest on the bead of a DTA thermocouple with such mating contact between the supporting thermocouple bead and the foil tray that practically all heat developed in the sample and in the thermocouple tray is delivered directly to the thermocouple bead.

---

This invention relates to apparatus for use in differential thermal analysis and more particularly to improvements in sample holder assembly for DTA.

PRIOR ART

A variety of mineral and chemical materials when subjected to changes in environmental heat or pressure display changes in energy level of the material during which the material may emit or absorb heat. Such thermonic changes and liberation of heat may accompany, proceed or trigger physical changes such as disassociation, reaction, melting or solidification, or recombination including combustion or explosion of the material. It should be readily apparent that the processors and transporters of activatable materials would want to know what to expect from materials at various temperatures or pressures, or in the presence of various gases or atmospheric conditions and that means of making miniature controlled tests of the thermonic behavior of material over a dynamic range of temperatures and pressures would be most desirable.

The basic principles of Dynamic Thermal Analysis were demonstrated by Le Chatelier and Roberts Austin and others more than half a century ago. Basically, DTA is a technique for displaying or observing changes in the energy level of a sample substance by arranging a pair of matched thermocouples connected in opposing electrical relationship so that balanced pair of thermocouples produce a zero electrical output over a dynamic range of temperatures so long as both thermocouples are subjected to the same or equal heat levels. If a sample of the substance to be tested is placed near one of the thermocouples and a reference substance is placed near the other thermocouple, and the apparatus and both samples are all heated at a programmed rate, the test sample will react at some temperature releasing or absorbing heat in a sudden burst causing the paired thermocouples to become unbalanced with the resultant producion of a differential voltage at the output leads of the paired thermocouples. Such differential voltage will be relatively proportional to the changes in the energy level of the sample material and may be plotted on charts by conventional techniques to form a graphic record of differential voltage and the thermonic characteristics of the sample material over a dynamic heating range.

Such graphic profiles of the thermonic characteristics of specific sample materials have been sufficiently useful to insure a full half century of experimental construction and use of "homemade" DTA apparatus and a mushrooming literature on the subject. The literature has always claimed, and in theory DTA techniques should be useful in material identification and in quality and purity control tests. In practice, however, specific apparatus for DTA work has worked well only when used with loving care in the hands of the researcher who designed and built the particular DTA apparatus. Under the circumstances very little of the DTA apparatus has found its way into the patent art and even less has proven practical to mass manufacture for a commercial market.

While the DTA process appears simple the application of the process falters upon problems inherent in the construction of DTA apparatus. Thermocouples of sufficient sensitivity and quickness of response to produce output wave forms high amplitude and good resolution are likely to be small, fragile, and expensive and have to operate at high temperatures under adverse circumstances. To obtain accurate temperature readings it is necessary to place the test sample as close to the thermocouple as possible but direct contact between the thermocouple and the test material is so likely to produce fusion or reaction between the test material and the expensive thermocouple as to make it necessary to introduce sample cups or trays between the thermocouple and the test sample. Since the sample holder enclosure is heated, the thermocouple balance can be maintained only by placing cups near each of the paired thermocouples and the sample cups or trays must be nearly identical in material, mass, and heat absorbing capacity or one of the trays will absorb more heat than the other, unbalance the thermocouple apparatus and compromise the accurary of the differential output voltage readings. The difficulty of fabricating identical test cups should be readily apparent.

In the early days sample holders for plotting thermograms for mercury and various liquid materials tended to be made of ceramic materials and were often about the size of a coffee mug. These heavy cups were mounted on support posts made of heat insulative material with a thermocouple mounted in a tabular apparatus in the center of each support post. The test sample, reference sample, cups and apparatus, etc. were then enclosed in a furnace or oven to provide dynamic heating at a controlled rate. Since the metal wires that form and support the paired thermocouples become soft or ductal at temperatures between 1000° centigrade and 1500° centigrade and any bending or repositioning of the thermocouples during or between tests disrupts the calibration and reliability of the thermocouples, it has been most important to prevent any material weight from resting directly on said thermocouples and to employ such protective mounting of the thermocouples as to prevent damage when sample holder cups are placed on or removed from the support posts. Some experimenters have sought to surround the thermocouple bead by casting or drilling a protuberance or recess into the bottom of sample holder cup into which the bead of the thermocouple could project. Sample test vials with such a thermocouple recess are illustrated in FIG. 1 of an abstract on "Differential Thermal Study of Prosynthesis" by Edgar M. Bollin, James A. Dunne and Paul F. Kerr in Science, vol. 131, on page 661. Another illustration of a sample holder cup provided with a protuberance in the base of the cup to receive a modified post mounted thermocouple is illustrated in FIG. 7 of "A Differential Thermal Analysis Apparatus for Temperatures up to 1575° C." by Kenneth G. Skinner, Naval Research Laboratory Report 4942, May 24, 1957.

If the differential thermocouples are sheltered within the support post structure there is both a delay and a loss of heat in the indirect transmission from the test sample to the cup, to the thermocouple with a resulting compromise in sensitivity and reduced resolution quality. If the thermocouple is allowed to project above the support post, the resolution quality of the thermograms is materially improved but in the past experiments with such structures have almost inevitably resulted in damage to the expensive thermocouples. If the mass of the test sample is large and the mass of the test cup is even larger and the test sample during the heating cycle diminishes in mass because of evaporation on sintering and shrinkage or evaporation, as often is the case, we are measuring a different (reduced) sample at the end of the test than the sample that we started with, and the results of the test are compromised. The apparent answer is to run tests on very small samples of the test material so that shrinkage of the sample mass will be of less proportional significance. But the design of DTA apparatus for analyzing miligram and microgram specimens runs into its own variety of problems.

If the test sample specimen is to be very small and the sample holder cups weigh several hundred milligrams, the heat absorbed by the cup will exceed the heat produced by the microgram specimen by such a large margin as to mask the thermal activity of the specimen. If the specimen is sufficiently solid and will not sinter or melt at the temperatures to be used in the test, experimenters have returned to first principles, bent the wires supporting the thermocouples into a horizontal plane and mounted the specimen particles directly on the same wires that support the thermocouple. There are so few materials that can be supported directly on the thermocouple support rings, however, without interacting with or corroding the thermocouple that direct ring mounting is of very limited practicality. The next logical step in handling powdered specimens or specimens that can melt or corrode is to produce a miniature foil tray from a chemically neutral metal foil that will be light enough for the tray and test specimen to both rest on the wire support leads to the DTA thermocouples.

Such foil trays were introduced into the DTA art several years ago and were quickly adapted for a variety of applications. An easily accessable illustration of a miniature foil tray adapted to set on or in and be supported by the wire leads to the thermocouples is provided in U.S. Patent No. 3,298,220 to Stone and Burress. At least three interacting or inter-related problems arise to limit or compromise the accuracy and utility of such DTA structures in which the thermocouple leads are fabricated into a horizontal plane that must support both the thermocouple and the sample holder tray with its sample. As temperatures in the sample holder assembly approach and pass beyond 1500 degrees the metal materials used for the thermocouple leads and support ring and used for the foil trays become soft and ductal. If the foil sample tray gets soft first it tends to turn into a flexible bag that shifts position and can eventually slip through the support ring. On the other hand the horizontally disposed thermocouple leads and ring form a fulcrum arm supported only by the strength of the wire leads. The downward stress on the horizontal wire leads and ring are increased when the sample tray and sample are placed in or on said ring support wires. As the temperature in the sample holder assembly approaches and passes 1500 degrees said thermocouple wire leads become ductal and droop. At some point the sample tray will fall off and in any event the change in position of the thermocouple will have compromised the test results and ruined the expensive thermocouples. In addition the ring shaped thermocouple leads serve as heat sink having extensive contact with the sample tray and lead heat away from as well as to the thermocouple further compromising the accuracy and resolution of the resulting test data.

Such delicate apparatus requires that both the sample tray and sample specimen be reduced to the smallest mass and weight possible and as the quanity of the specimen being tested is reduced the burst of energy produced by the thermonic reaction of the test specimen is reduced so that a reasonably sharp degree of resolution in the DTA readings can be maintained only by eliminating or minimizing every possible point of heat loss and by guiding all of the heat from the thermonic reaction of the test specimen as directly as possible to the thermocouple.

A further factor compromising the resolution quality of DTA test readings has resulted from the development of non-semetrical heat gradiants across the structure of the sample holder assembly such that excess heat was channeled to one thermocouple or drained away from the other thermocouple subjecting the differential thermocouples to differences in environmental heat from sources other than the thermonic reaction of the test specimen. For example with the development of interchangeable "plug in" sample holder assemblies it became customary to co-axially suspend the sample holder assembly within the DTA oven or heating furnace by means of a pair of support posts or tubes which could also be used as a means of injecting a hot environmental gas through one of the tubes and exhausting the gas through the other tubes. The custom of employing two support posts or support tubes to support the sample holder assembly within the furnace has continued in spite of miniaturization of the size of all other parts of the sample holder assembly. In the case of small sample holders for DTA tests at the microgram level the two support tubes are large compared to the rest of the sample holder structure and necessarily function as heat sinks through which heat is drained away from the sample holder assembly. Since it is impossible to fabricate the two support tubes with indentical mass and heat absorbing and conducting characteristics one of said support tubes must drain away more heat than the other producing a heat gradient across to structure of the sample holder assembly. As the heat gradient develops parts of the sample holder assembly will expand more rapidly than other parts and will cause one of the support tubes to expand and bind more than the other with a further aggravation in the rate of differential heat drain through the two support tubes. The progressively increasing differential heat drain and heat gradient must necessarily effect the differential thermocouples with resulting prejudice to the accuracy and resolution of the measurement of the thermonic reaction of the test specimen.

OBJECTS OF THE INVENTION

The key problem in DTA apparatus arises in actual physical placement of the specimen and sample holding tray in such close physical relationship to the thermocouple as to deliver all thermonic emmissions from the specimen under test to the thermocouple with a minimum of extraneous heat losses. Since any contact between the sample holder tray and any structure other than the thermocouple results in extraneous heat loss, a major object of this invention is to provide an improved DTA sample holder assembly in which the support system for the sample holder tray is designed to provide such support with a minimum amount of contact with the sample tray. In order to channel practically all of the heat of a micro-gram specimen directly to the measuring thermocouple with a minimum of extraneous heat loss this invention employs a miniature foil sample tray adapted to rest in mating relationship directly upon the thermocouple bead, and to eliminate all alternate avenues of heat escape by supporting the sample holder tray by such means that the tray has only one other point of contact and support and constructing this second point of supporting contact of a thermally non-conductive material.

Another object of this invention is to fabricate this second point of contact or support for the sample holder tray with such a sharp edge and of such structure as to maintain this second "point" of contact of the smallest area possible to further minimize the avenues of heat loss.

A further object of the invention is to fabricate the different thermocouples in a vertical plane with the thermocouples supporting leads or legs incased in sleeves of non-heat conductive material to provide sufficient rigidity to the thermocouple leads at high temperatures to enable the thermocouple to carry a modest weight without damaging or displacing the thermocouple. This permits the development and use of a foil sample tray fabricated with a dimple in the base of said tray that can fit over and around and rest directly on the bead of the DTA thermocouple with such close mating contact between the supporting thermocouple bead and the foil tray that practically all heat developed in the sample and in the thermocouple tray will be delivered directly to the thermocouple bead. It should also be appreciated that when a sample holder tray receiving its principal source of support from such a vertically positioned thermocouple becomes ductal or soft with increases in environmental heat that the weight of the tray and sample will make the soft boil tray cling even more closely to the thermocouple bead with a further increase in heat transfer from the sample tray to the thermocouple.

Still another object of the invention is to eliminate heat gradients across or through the sample holder assembly by building the sample holder enclosure and component parts around a single support post or tube in as symetrical an arrangement as possible so that the environmental heat around each of the thermocouples is maintained as near equal as possible.

A further object of the invention is to fabricate the DTA sample holder assembly in the form of an interchangeable plugin module that is coaxialy suspended within the oven or heating furnace on a single support tube or post. The reduction in the number of points and areas of direct contact between the sample holder assembly and the furnace and associated DTA equipment produces more even heat distribution through the sample holder assembly. By fabricating the sample holder assembly as an interchangable plug-in module analogous to an octal type electronic vacuum tube with the support post or tube on the sample holder assembly being analogous to the center guide pin on an octal type electronic vacuum tube a high degree of flexibility and versitility can be achieved in which a range of inter-changeable plug-in sample holder modules can be adapted to handle varying sizes and forms of test specimens. By providing a plurality of plug-in sample holder assemblies having thermocouples fabricated from a variety of materials the operator of the DTA test equipment is enabled to select and use a sample holder assembly provided with thermocouples capable of producing the highest parctical output (maximum sensitivity) for the temperature range at which the particular test must be run.

These and other objects and advantages of this invention will become apparent through consideration of the following description and appended claims in conjunction with the attached drawings.

DESCRIPTION OF THE SEVERAL VIEWS IN THE DRAWINGS

FIG. 1 is a perspective view of the exterior appearance of the plug-in sample holder assembly constructed in accordance with the principles of this invention;

FIG. 2 is a perspective view of the base or block of said sample holder assembly showing the positions of differential thermocouples within the sample holder assembly;

FIG. 3 is a perspective view of the cup shaped cap or cover of said DTA sample holder assembly;

FIG. 4 is a partially sectional view of a sample holder assembly constructed in accordance with the principles of this invention;

FIG. 5 is a perspective view of the sample tray used in this invention showing the dimple in the base of the tray;

FIG. 6 is a partially cut away view of the sample tray showing how the dimple in the tray bottom rests directly on the bead of the thermocouple;

FIG. 7 is a perspective view of the thermocouple support post and sleeve showing how the legs or support leads to the thermocouple are supported and protected and the special sharp edge provided on the upper surface of the support sleeve;

FIG. 8 is a cross section view of the sample tray, the thermocouple, and thermocouple support post and sleeve showing how the dimple in the bottom of the sample tray rests directly on the bead of the thermocouple and how the sample tray is tilted so that only one point on said tray touches the support sleeve;

Figure 10:
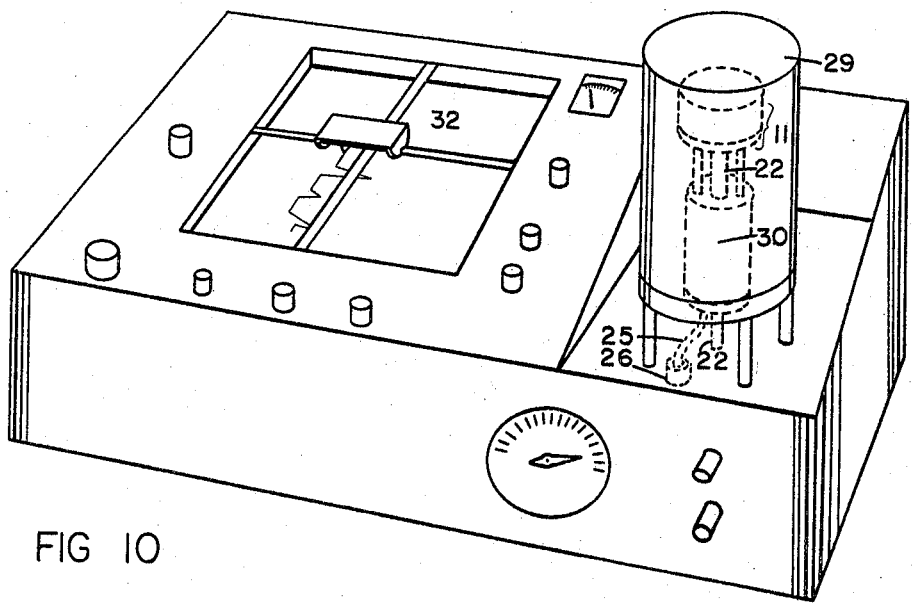
FIG. 10 shows a perspective view of the exterior features of the inventor's DTA apparatus with a dashed line phantom view of a DTA sample holder constructed in accordance with the principles of this invention showing how the sample holder plugs into the DTA apparatus and how the sample holder assembly is coaxially mounted within the DTA furnace.

In describing one selected form or preferred embodiment of this invention as shown in the drawings and described in this specification, specific terms and components are used for clarity. However, it is not intended to limit the claimed invention to the specific form, components or construction shown and it is to be understood that the specific terms used in this illustration of the invention are intended to include all technical equivalents which operate in a similar manner to accomplish a similar purpose.

DETAILED DESCRIPTION OF PREFERRED EMBODIMENT OF INVENTION

Referring to the specific embodiment of the invention selected for illustration in the accompanying drawings, the improved DTA sample holder assembly is represented generally by the number 11 and comprises a block 12 on which the sample holder apparatus is assembled, a cup shaped cap 13 fabricated from a heat conductive material and adapted to fit over and mate with said block 12 to define a sample holder enclosure 14, within which are mounted differential thermocouples 15—15 which are mounted on support posts 16—16. Around each of the thermocouple support posts 16—16 is a support sleeve 17 provided with a sharply beveled edge 18 around the circumference of the upper end of said support sleeve. The improved sample holder assembly also includes a pair of special dish shaped metal foil sample trays 19—19 with each of said trays 19 being provided with a dimple 20 in the center of the base part of each sample tray. By fabricating support sleeve 17 to a height slightly greater than thermocouple support post 16 and mounting the thermocouples 15—15 to stand slightly higher than the sharp beveled edge of support sleeve 17, it is possible to support sample tray 19 at an inclined angle with the dimpled portion of said sample tray resting on, over and being supported by thermocouple bead 21 and the outside edge of sample holder tray 19 being supported at a single point on the beveled edge 18 of support sleeve 17 such that sample tray 19 during use has only two points of external contact and heat loss. The first of said contact points being a metal to metal heat conductive contact between the dimpled area 20 in the bottom of the sample tray 19 and thermocouple bead 21 and the second point of contact and support being at a single point on the sharp beveled edge 18 of support sleeve 17 which is constructed from a non heat conductive material so that practically all of the heat developed by the specimen is conducted directly to the metal foil sample tray and from the tray to the thermocouple bead with a minimum of extraneous heat loss. Said improved sample holder assembly is coaxially supported within a DTA furnace 29 by means of a single mounting post or tube 22 which serves as a plug-in guide post or pin by which interchangeable sample holder assemblies can be plugged into an appropriate receptacle in the main DTA apparatus as shown in FIG. 10 of the drawings. By providing guide post or pin 22 with a longitudinal tubular bore 23, or fabricating supporting guide post or pin 22 from a tubular material bore 23 can be used as a means of introducing gas into the interior of sample holder enclosure 14 so that said support guide tube 22 serves both as a plug-in support post and as a conduit for gas into said sample holder enclosure. Thermocouples 15—15 are wired in opposing electrical relationship to produce a differential thermocouple assembly as shown in the mixed block and schematic diagram in FIG. 9. Electrical wire leads 24—24 from the various thermocouples are brought out through cable 25 and plug-in electrical connector 26 which plugs into a connector receptacle (not shown) in the chassis of the main DTA apparatus as shown in FIG. 10. Said sample holder assembly 11 also includes a monitor thermocouple 27 which connects through electrical cable 25 and connector 26 to the heat sensing and heat control circuits 28 in the chassis of the main DTA apparatus. Insulator plug 30 mounted at an intermediate point on plug-in support tube 22 provides a means of substantially closing the opening (not shown) in the mounting base of furnace 29 through which support tube 22 must extend to reach and be plugged into the main DTA apparatus.

Figure 9:
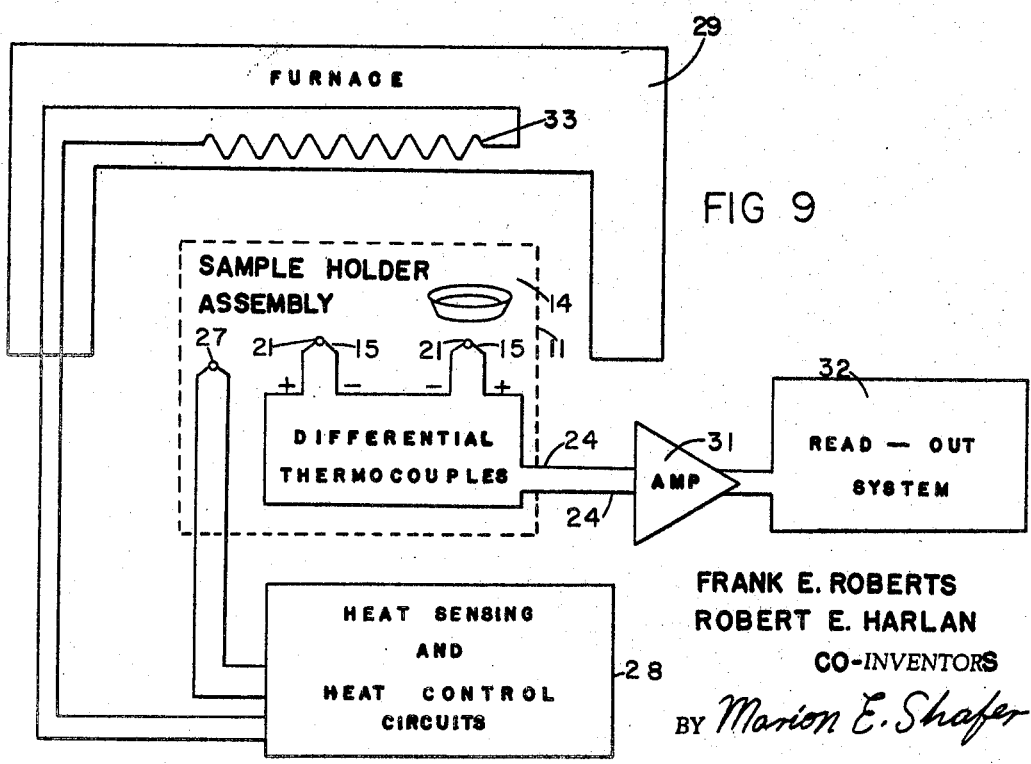
FIG. 9 is a mixed block diagram and schematic diagram illustrating the major features and apparatus involved in Dynamic Thermal Analysis testing of materials with the sample holder block involved in this invention enclosed within a dashed line.

Turning briefly to the associated DTA apparatus with which the improved sample holder asembly described herein will be used; FIG. 9 provides a mixed block and schematic diagram of the major components that make up a DTA system and FIG. 10 provides a pictorial illustration of the physical arrangement of these components assembled into a commercially marketable package. As previously noted the signal carrying leads 24—24 from differential thermocouples 15—15 in sample holder assembly 11 connect to a conventional amplifier 31 within the chassis of the main package of DTA apparatus shown in FIG. 10. The amplified differential signals are then read out on a meter, oscilloscope or a conventional read out and thermogram recording system 32 by techniques and equipment that is well known in the art. The DTA main chassis contains an electronic power supply or appropriate power source as part of the heat control circuits in block 28. Controlled quantities of electrical power from said heat control circuits in block 28 are applied to heater element 33 in furnace 29. Thermocouple 27 provides a means of measuring and monitoring the actual temperature inside of the sample holder enclosure and the electrical output of said thermocouple 27 is fed back to the heat sensing and control circuits in block 28 where the electrical power applied to furnace heater element 33 is adjusted to confine the rate of temperature increase to the rate programmed for the particular experiment. The controls for programming and adjusting the rate of furnace heating are mounted on the main DTA package shown in FIG. 10 but such controls are conventional so no attempt has been made to identify them. Gas is introduced into the sample holder assembly 11 by means of the bore through plug-in support tube 22 in a manner that the inventor considers unique and said support tube 22 plugs into a receptacle sleeve (not shown) mounted in the chassis of the main DTA package shown in FIG. 10 which tubular sleeve connects to a source of gas. The meters and controls for monitoring and controlling gas pressure and the flow of gas are shown in FIG. 10 but they are not identified since the gas control equipment is largely conventional.

Normally block 12 and cap 13 will be fabricated from a good heat conductive material and the prototypes of this invention were fabricated from stainless steel. Block 12 is provided with mating lips as shown in FIG. 2 so that cap 13 can be guided securely into proper position without disturbing the loaded sample holder cups that will normally rest on the thermocouples as described elsewhere. Plug in support tube 22 is cut to the desired length and about one inch of the upper end of the tube is milled to a smaller diameter producing a shoulder on said support tube 22. The thin or diminished part of tube 22 is forced through a hole in the very center of block 12 until said block 12 rests on the shoulder of trimmed support tube 22. The trimmed or diminished part of tube 22 should extend above the floor of block 12 to a height at least equal to or slightly higher than the height of thermocouples 15—15. By utilizing a round sample holder enclosure 14, arranging all of the parts within the sample holder enclosure in as symmetrical as possible arrangement around that part of support tube 22 that extends into sample holder enclosure 14 and injecting whatever heated environmental gas is used through a single opening in support tube 22 into the center of enclosure 14 the gas is forced upwards, spreads outward in all directions across the roof of the enclosure and then flows down past each of the loaded sample holder trays and thermocouples 15—15 and eventually out through port apertures 35—35. By this arrangement nearly equal amounts of gas pass each thermocouple exerting equal temperature affects on each of the thermocouple with minimum danger of producing heat gradients across the sample holder structure.

Thermocouples 15—15 are mounted vertically on support posts 16—16 with thermocouple beads 21—21 extending slightly higher than the shoulders of support sleeves 17—17, as previously explained, while the wire leads or legs from said thermocouples extend down through bores 35—35 through support posts 16—16 to provide vertical strength to said thermocouple leads at high temperatures. Said thermocouple electrical leads 24—24 then extend through heat insulative sleeves 34—34 into an insulator plug 30 where they are formed into cable 25 which via means of electrical connector 26 connects to DTA amplifier 31 in the main apparatus package as previously explained.

ADVANTAGES

In the employment of a single tube support system for the improved DTA sample holder assembly described herein with symetrical arrangement of the sample holder parts on the sample holder block with resulting reduction of heat gradients across the sample holder structure together with improvements in the method of supporting the special sample tray directly on the thermocouple bead even at high temperatures with minimum heat losses between the specimen and the thermocouples the inventor has secured substantial improvements in both the sensitivity and resolution quality of the DTA readings obtainable.

Although this specification describes but a single embodiment of the invention with certain applications thereof, it should be understood that structural or material rearrangements of adequate or equivalent parts, substitutions of equivalent functional elements and other modifications in structure can be made and other applications devised without departing from the spirit and scope of our invention. We therefore desire that the description and drawings herein be regarded as only an illustration of our invention and that the invention be regarded as limited only as set forth in the following claims, or as required by the prior art.

Having thus described our invention, we claim:
1. In apparatus for analyzing the thermonic characteristics of sample materials over a range of temperature and environmental conditions, an improved plug-in sample holder assembly comprising:
(A) a sample holder enclosure comprising
  (1) a sample holder block, and
  (2) a cup-shaped cap adapted to fit over and mate with said block to define an interior space;
(B) a single support tube passing through and secured to said block to provide a plug-in and removable means of co-axially supporting said sample holder enclosure within a DTA furnace;
(C) a pair of thermocouple support posts mounted vertically on said block and each of said posts provided with a plurality of longitudinal bore holes of sufficient diameter to permit the passage of thermocouple wires;
(D) a support sleeve made from thermally non-conductive material around each of the thermocouple support posts, each of said support sleeves being
  (1) fabricated to extend to a slightly greater height than the thermocouple support posts, and
  (2) each of said sleeves being beveled to a sharp edge around its upper circumference;
(E) a vertically positioned thermocouple mounted on each of the thermocouple posts with
  (1) the thermocouple bead being positioned to project slightly higher than the sharp edge of the surrounding support sleeve,
  (2) the wire leads from said pair of thermocouples extending through the longitudinal bore holes in the thermocouple support posts, and
  (3) said pair of thermocouples being wired in opposing electrical relationship to produce a differential thermocouple assembly;
(F) electrical lead means and plugin connective means to electrically connect said differential thermocouples to a conventional DTA amplifier and read-out indicator system;
(G) means for monitoring the temperature inside the sample holder assembly;
(H) a pair of dish shaped sample trays, each of said sample trays being
  (1) fabricated from heat conductive metal foil,
  (2) provided with a dimple at the center of the base of said sample tray,
    (a) said dimple being adapted to fit over and rest on said thermocouple bead in mating relationship,
    (b) forming a first heat conductive support contact point for said sample tray, and
  (3) each of said sample trays being of sufficient diameter for the dimple on said tray bottom to rest on the thermocouple bead, and when in a slightly tilted position, for the outside edge of the sample tray to extend to and rest on a single point along the sharp beveled edge of the support sleeve to provide a second support point on a non-heat conductive surface such that the sample holder tray when in operative position has only two points of external contact and one of these is on a non-heat conductive surface.

References Cited

UNITED STATES PATENTS

| | | | |
|---|---|---|---|
| 3,285,053 | 11/1966 | Mazieres | 73—15 |
| 3,298,220 | 1/1967 | Stone et al. | 73—15 |
| 3,303,689 | 2/1967 | Paulin et al. | 73—15 |

RICHARD C. QUEISSER, Primary Examiner

HERBERT GOLDSTEIN, Assistant Examiner